UNITED STATES PATENT OFFICE.

CHARLES WALPUSKI, OF YONKERS, ASSIGNOR TO JOSEPH RECKENDORFER, OF NEW YORK, N. Y.

IMPROVEMENT IN COPYING-PENCILS.

Specification forming part of Letters Patent No. 192,555, dated June 26, 1877; Reissue No. 7,908, dated October 9, 1877; application filed September 26, 1877.

DIVISION B.

*To all whom it may concern:*

Be it known that I, CHARLES WALPUSKI, of Yonkers, Westchester county, New York, have invented a certain new and useful Composition of Matter for Writing, Marking, and Copying Purposes, of which the following is a specification:

The composition of matter in which my invention is found consists, in the main, of a coloring matter essentially soluble, combined with a suitable base or binding medium, sufficient to hold the coloring matter together in the form which it is desired to impart to the solid composition. Thus, for a coloring matter I take aniline soluble in water, and for a binding medium any suitable material or materials heretofore used for like purposes in the art.

My new composition of matter is designed for marking, writing, and copying purposes. It is adapted to form pencil-leads. It is readily soluble in water, and will form or give off, when water is applied to it, an excellent ink.

To enable others to understand and use my invention, I shall now proceed to describe one way of carrying it into effect, selecting for this purpose its application to the manufacture of pencil-leads. In this manufacture the method I employ is substantially that which is used in making ordinary composition-leads, save that I use aniline in such proportions as to make the "lead" what may be called an "ink-copying pencil-lead."

I select aniline soluble in water. I dissolve it in alcohol and water, and add thereto a proper proportion of fine prepared clay. This composition I intimately mix by grinding or otherwise, and subsequently evaporate it in a suitable vessel. To the remainder I add a binding medium, such, for instance, as a solution of gum-tragacanth, until the whole mass becomes a plastic paste, which can be readily kneaded and molded. The clay and gum serve as a base and binding medium for the aniline. Both affect the hardness and consistency of the composition according to the quantity used therein. One compound which gives good results is, one hundred parts aniline, fifty parts white clay, and ten parts gum. By varying, however, the proportion of these materials, compositions of various degrees of hardness or softness can be obtained. When the paste is brought to the desired consistency I press it into any shape that may be desired, then allow it to dry perfectly, and then cut it into the desired lengths.

The pencil-cores thus produced may then be dipped into hot melted grease, and afterward are cooled. The dipping may, however, be dispensed with. This completes the process of manufacture, and the cores are ready to be combined with wooden or other sheaths or handles, in the usual way.

The marks of pencil-leads thus made are susceptible of being copied on moist paper in the ordinary letter-press as readily as if they were made with copying-ink, this being due to the fact that the composition in its nature is a solid copying-ink. For, as above stated, it is readily soluble in water, and when mingled with water gives off or forms an excellent writing and copying ink.

According to the color of the aniline employed, I produce different-colored compositions, and in proportion to the quantity of the base or binding medium mingled with the aniline I make the composition of different degrees of hardness or softness. I prefer the use of aniline as coloring matter. It is readily soluble in water and easily affected by contact with the same. Any other coloring matter, however, which will, under the same conditions, act in the same way as the aniline, will answer the purpose. And, in lieu of clay and gum, I can employ any ordinary or suitable base or binding medium which will properly hold together the soluble coloring matter in the composition.

Having described my invention, what I here claim is as follows:

1. The solid composition of matter for writing, marking, and copying purposes, consisting, in the main, of a soluble coloring matter, such as aniline, in combination with a suitable base or binding medium, substantially as set forth.

2. The within-described composition of matter for marking and copying purposes, consisting of aniline, gum, and clay, in the proportions substantially as set forth.

In testimony whereof I have hereunto signed my name this 19th day of September, 1877.

CHARLES WALPUSKI.

Witnesses:
WILLIAM V. A. POE,
LEOPOLD ANSBACHER.